US012316582B2

(12) United States Patent
Sugimoto et al.

(10) Patent No.: US 12,316,582 B2
(45) Date of Patent: May 27, 2025

(54) NOISE CANCELLATION DEVICE FOR WIRELESS COMMUNICATION SYSTEM INCLUDING WIRELESS COMMUNICATION DEVICES CONFIGURED AS ARRAY

(71) Applicant: OMRON Corporation, Kyoto (JP)

(72) Inventors: Yoshiki Sugimoto, Kyoto (JP); Akito Murai, Kyoto (JP); Kentaro Hamana, Kyoto (JP); Manh Tai Nguyen, Kyoto (JP)

(73) Assignee: OMRON CORPORATION, Kyoto (JP)

( * ) Notice: Subject to any disclaimer, the term of this patent is extended or adjusted under 35 U.S.C. 154(b) by 543 days.

(21) Appl. No.: 17/627,931

(22) PCT Filed: Aug. 7, 2019

(86) PCT No.: PCT/JP2019/031191
§ 371 (c)(1),
(2) Date: Jan. 18, 2022

(87) PCT Pub. No.: WO2021/024426
PCT Pub. Date: Feb. 11, 2021

(65) Prior Publication Data
US 2022/0263643 A1    Aug. 18, 2022

(51) Int. Cl.
*H04L 5/16*    (2006.01)
*H04B 1/10*    (2006.01)
(Continued)

(52) U.S. Cl.
CPC .............. *H04L 5/16* (2013.01); *H04B 1/10* (2013.01); *H04B 1/525* (2013.01); *H04L 5/1461* (2013.01)

(58) Field of Classification Search
CPC ........... H04L 5/16; H04L 5/1461; H04B 1/10; H04B 1/525
See application file for complete search history.

(56) References Cited

U.S. PATENT DOCUMENTS

2007/0183545 A1* 8/2007 Yuda .................... H04B 7/0617
375/347
2008/0089397 A1    4/2008 Vetter et al.
(Continued)

FOREIGN PATENT DOCUMENTS

JP    2008005448 A    1/2008
JP    2008028450 A    2/2008
(Continued)

OTHER PUBLICATIONS

International Search Report for International Application No. PCT/JP2019/031191; Date of Mailing Oct. 15, 2019.
(Continued)

*Primary Examiner* — Kodzovi Acolatse
*Assistant Examiner* — Maryam Emadi
(74) *Attorney, Agent, or Firm* — CANTOR COLBURN LLP

(57) ABSTRACT

A noise cancellation device for a wireless communication system is provided to include wireless communication devices each using a digital phase modulation and each performing half-duplex communication. The wireless communication devices is configured as an array, and the noise cancellation device is provided for suppressing an wraparound signal from other wireless communication device by combining a cancellation signal obtained by controlling at least one of a phase and an amplitude of a transmission carrier signal with a received wireless signal based on a baseband signal of the received wireless signal. The noise cancellation device includes a controller configured to determine whether a number of bits per one frame of the baseband signal to be transmitted is an odd number or an even number, and to invert the cancellation signal when the number of bits per one frame of the baseband signal to be transmitted is an even number.

2 Claims, 3 Drawing Sheets

(51) Int. Cl.
*H04B 1/525* (2015.01)
*H04L 5/14* (2006.01)

(56) References Cited

U.S. PATENT DOCUMENTS

| | | |
|---|---|---|
| 2009/0130981 A1 | 5/2009 | Nagai et al. |
| 2017/0019138 A1 | 1/2017 | Hitomi et al. |

FOREIGN PATENT DOCUMENTS

| | | | | |
|---|---|---|---|---|
| JP | 2010507337 A | 3/2010 | | |
| WO | 2015151745 A1 | 10/2015 | | |
| WO | WO-2018118226 A1 * | 6/2018 | .............. | H02M 1/12 |

OTHER PUBLICATIONS

PCT Written Opinion of the International Searching Authority for International Application No. PCT/JP2019/031191; Date of Mailing, Oct. 15, 2019.

* cited by examiner

NOISE CANCELLATION DEVICE FOR WIRELESS COMMUNICATION SYSTEM INCLUDING WIRELESS COMMUNICATION DEVICES CONFIGURED AS ARRAY

CROSS REFERENCE TO RELATED APPLICATIONS

This is the U.S. national stage of application No. PCT/JP2019/031191, filed on Aug. 7, 2019. Priority is claimed herewith and the disclosure of which is also incorporated herein by reference.

TECHNICAL FIELD

The present invention relates to a noise cancellation device for a wireless communication system, and the wireless communication system.

BACKGROUND ART

In a wireless communication system including a plurality of wireless communication devices each using a phase-amplitude modulation and each performing half-duplex communication, where the wireless communication devices are configured as an array, when a post-modulation signal is used as a reference signal outputted to a cancellation circuit for reducing wrap-around signals from other channels, the amplitude of the signal for cancellation may become extremely small, and the performance of canceling the wrap-around signal will be degraded.

In order to solve this problem, in Patent Document 1 of a conventional example, it has been known to prevent the amplitude of the reference signal from becoming extremely small by using a carrier signal instead of a post-modulation signal as the reference input signal outputted to the cancellation circuit, and this leads to preventing from reduction of the cancellation effect of the wraparound signal.

PATENT DOCUMENT

Patent Document 1: Japanese patent laid-open publication No. JP2008-005448A

SUMMARY OF THE INVENTION

Problem to be Solved by the Invention

However, in the conventional example, phase inversion of the transmission signal occurs depending on the even or odd number of the number of bits of the baseband signal. Therefore, depending on the type of transmission instruction, the reference signal and the wrap-around signal inputted to the cancellation circuit are superimposed on each other, resulting in degradation of the cancellation performance. Specifically, when the number of bits per one frame of the baseband signal is an even number, the noise component is amplified in the reading part within the frame.

The purpose of the present invention is to solve the above problems, and to provide, in a wireless communication system, in which a plurality of wireless communication devices each using a digital phase modulator and each performing half-duplex communication are configured as an array, a noise cancellation device for the wireless communication system and the wireless communication system, each capable of preventing degradation of cancellation performance.

Means for Solving the Problems

According to one aspect of the present invention, there is provided a noise cancellation device for a wireless communication system including a plurality of wireless communication devices each using a digital phase modulation and each performing half-duplex communication. The plurality of wireless communication devices is configured as an array, and the noise cancellation device is provided for suppressing an wrap-around signal from other wireless communication device by combining a cancellation signal obtained by controlling at least one of a phase and an amplitude of a transmission carrier signal with a received wireless signal based on a baseband signal of the received wireless signal. The noise cancellation device includes a controller configured to determine whether a number of bits per one frame of the baseband signal to be transmitted is an odd number or an even number, and to invert the cancellation signal when the number of bits per one frame of the baseband signal to be transmitted is an even number.

Effects of the Invention

Accordingly, according to the noise cancellation device for the wireless communication system, in the wireless communication system, in which the plurality of wireless communication devices each using the digital phase modulator and each performing half-duplex communication are configured as the array, the noise cancellation device determines whether the number of bits per one frame of the baseband signal to be transmitted is an odd number or an even number, and to invert the cancellation signal when the number of bits per one frame of the baseband signal to be transmitted is the even number, and then, this leads to preventing from degradation of the cancellation performance.

BEST MODE FOR IMPLEMENTING THE INVENTION

The following describes embodiments of the present invention with reference to the drawings. The same numerical reference is attached to the same or similar components.

Figure 1:
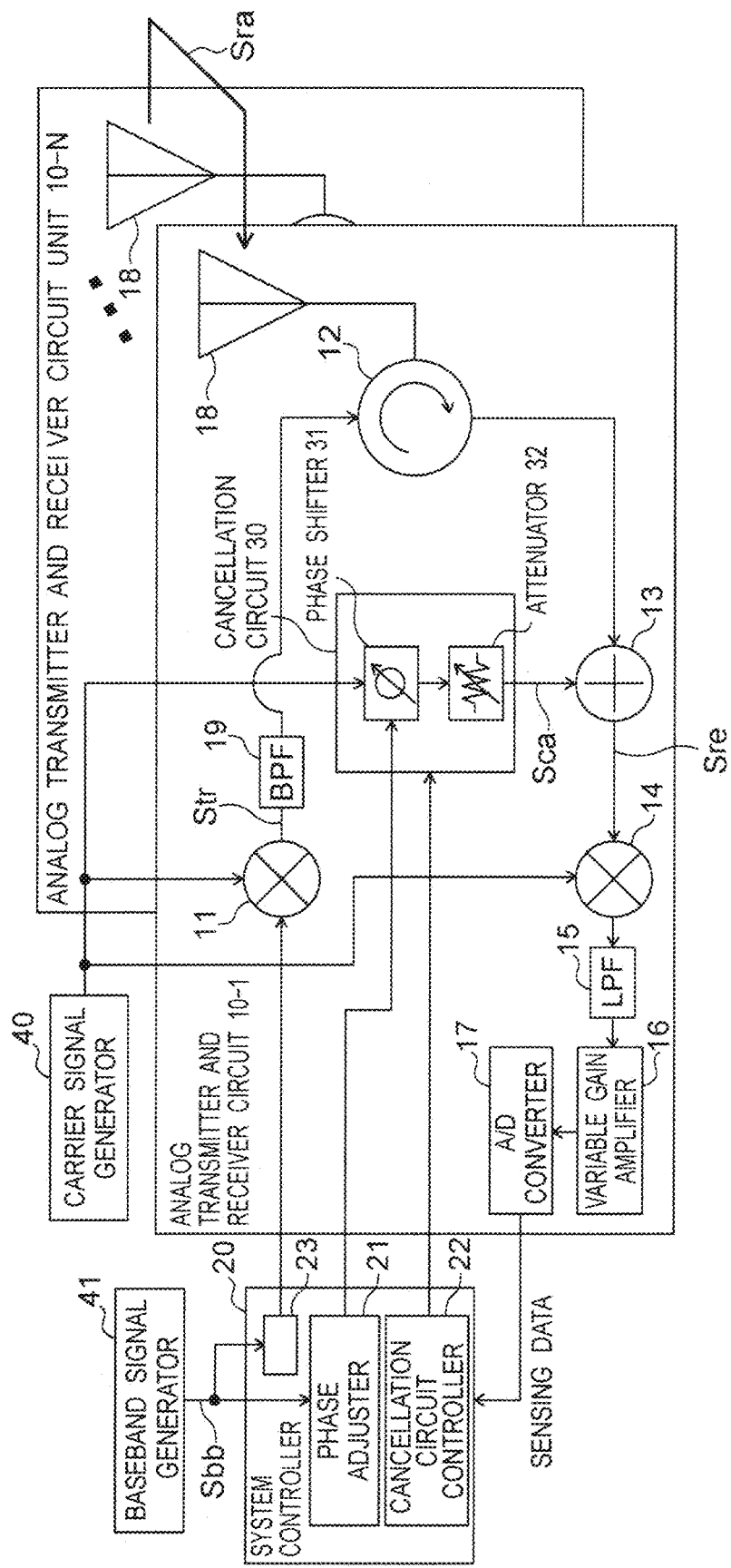
FIG. 1 is a block diagram of an example configuration of a wireless communication system according to an embodiment.

FIG. 1 is a block diagram of an example configuration of a wireless communication system according to an embodiment. In FIG. 1, for simplicity of illustration, amplification means for wireless transmission signals and wireless received signals are omitted.

Referring to FIG. 1, the wireless communication system includes a plurality of wireless communication devices each using PSK (Phase Shift Keying) modulation and each performing half-duplex communication, and the wireless communication devices are configured as an array. The wireless communication system is characterized by including a noise cancellation device. As described above, in order to solve the problems of the conventional example where the noise component is amplified in the reading part in a frame when the number of bits per one frame of the baseband signal is an even number, compared with the conventional example, the present wireless communication system determines whether the number of bits per one frame of the baseband signal is an odd number or an even number. The wireless communication system is characterized by further including a phase adjuster 21 that controls the carrier signal inputted to the phase shifter 31 to be inverted when it is an even number.

Referring to FIG. 1, the wireless communication system has an array configuration, with a plurality of N analog transmitter and receiver circuit units 10-1 to 10-N (hereinafter collectively referred to as "10"). The wireless communication system includes a carrier signal generator 40, a baseband signal generator 41, and a system controller unit 20. The system controller unit 20 includes the phase adjuster 21, a cancellation circuit controller unit 22, and a PSK modulator 23. In addition, each of the analog transmitter and receiver circuit units 10 has the same configuration as each other, and includes a mixer 11, a band-pass filter (hereinafter, referred to as "a BPF") 19, a circulator 12, an antenna 18, a signal combiner 13, a mixer 14, a low-pass filter (hereinafter referred to as an LPF) 15, a variable gain amplifier 16, an A/D converter 17, and a cancellation circuit 30. In addition, the cancellation circuit 30 includes the phase shifter 31 and an attenuator 32.

The carrier signal generator 40 generates a carrier signal of a predetermined radio frequency, and outputs the carrier signal to the mixer 11 and the phase shifter 31. On the other hand, the baseband signal generator 41 generates a baseband signal containing information to be transmitted and outputs the baseband signal to the phase adjuster 21 and the PSK modulator 23. The PSK modulator 23 generates a PSK modulated signal by PSK modulating a predetermined intermediate frequency signal according to the baseband signal, and outputs the PSK modulated signal to the mixer 11. The mixer 11 performs high-pass frequency conversion (up-conversion) by mixing the input PSK modulation signal with the carrier signal to generate the transmission signal Str. The mixer 11 outputs the transmission signal Str through the BPF 19 with a predetermined transmit bandwidth and the circulator 12 to the antenna 18 to radiate the wireless transmission signal from the antenna 18.

The carrier signal from the carrier signal generator 40 is inputted to the signal combiner 13 via the phase shifter 31 and the attenuator 32 of the cancellation circuit 30. The phase shifter 31 is controlled to shift the phase of the input carrier signal based on the respective control signals from the phase adjuster 21 and the cancellation circuit controller unit 22. The attenuator 32 controls the amplitude of the input carrier wave signal based on the control signal from the cancellation circuit controller unit 22, and outputs a controlled cancellation signal Sca to the signal combiner 13.

The received wireless signal received by the antenna 18 is inputted to the signal combiner 13 via the circulator 12. The signal combiner 13 combines the input received wireless signal with the carrier signal from the attenuator 32, and outputs a received signal Sre which is a combined signal to the mixer 14. The mixer 14 performs low-pass frequency conversion (down-conversion) by mixing the input received signal Sre with the carrier signal. After that, the mixer 14 outputs mixed signals after the low-pass frequency conversion to the LPF 15, which extracts only the baseband signal, and the variable gain amplifier 16 to the A/D converter 17. The A/D converter 17 converts the input analog baseband signal into sensing data of a digital baseband signal, and outputs the sensing data to the cancellation circuit controller unit 22 of the system controller unit 20.

The cancellation circuit controller unit 22 preferably operates in a manner similar to the cancellation signal control unit (50) of Patent Document 1, to controls the phase and/or the amplitude of the Sca as follows:

(1) the signal strength of the sensing data does not include zero and is within the range where the signal combiner 13 and the amplifiers etc. are not saturated; and (2) the signal strength of the cancellation signal Sca is made as small as possible.

In this way, as in the conventional example, within predetermined upper and lower limits, the wrap-around signal Sra from the other analog transmitter and receiver circuit units 10 included in the wireless received signal can be processed as in the conventional example to be cancelled necessarily and sufficiently, as well as minimizing the degradation of the signal-to-noise ratio.

The phase adjuster 21 determines whether the number of bits per one frame of the input baseband signal Sbb is an odd number or an even number.

(A) When the number of bits per one frame of the baseband signal Sbb is the odd number, the phase shifter 31 shifts the cancellation signal Sca using only the amount of phase shift related to the cancellation circuit controller unit 22 described above in the phase shifter 31.

(B) When the number of bits per one frame of the baseband signal Sbb is the even number, the cancellation signal Sca is shifted by the phase shifter 31 by the amount of phase shift related to the sum of the cancellation circuit controller unit 22 described above in the phase shifter 31, and 180 degrees (inverted).

As described above, the conventional example has such a problem that, when the number of bits per one frame of the baseband signal is an even number, the noise component is amplified in the reading part in the frame. In contrast, in the embodiment configured as described above, the phase adjuster 21 determines whether the number of bits per one frame of the input baseband signal Sbb is an odd number or an even number. Then, when the number of bits per one frame of the baseband signal Sbb is an even number, the cancellation signal Sca is inverted to prevent the noise components from being amplified in the reading part of the frame.

Figure 2A:
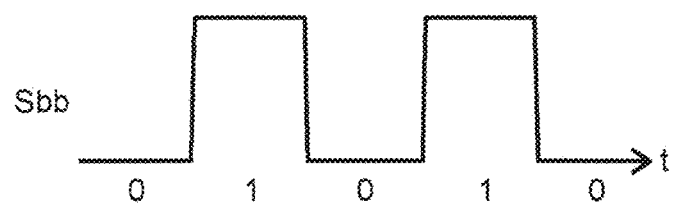
FIG. 2A is a signal waveform diagram showing an example of a baseband signal Sbb generated by the baseband signal generator 41 in the wireless communication system of FIG. 1, the baseband signal Sbb having an odd number of bits per one frame (referred to as a first case hereinafter).
Figure 2B:
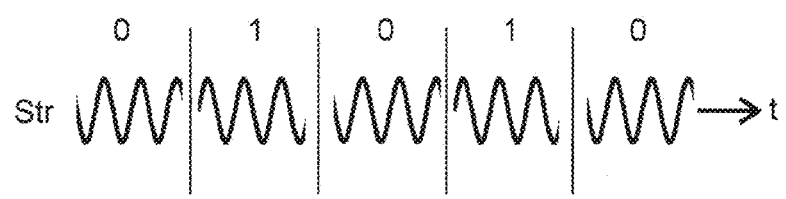
FIG. 2B is a signal waveform diagram showing an example of a transmission signal Str outputted from a mixer 11 in the first case in the wireless communication system of FIG. 1.
Figure 2C:
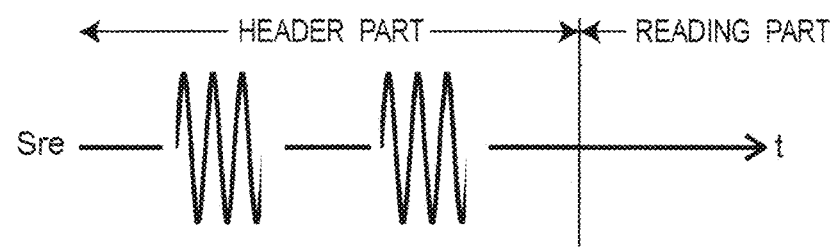
FIG. 2C is a signal waveform diagram showing an example of a received signal Ste outputted from a signal combiner 13 in the first case in the wireless communication system of FIG. 1.

FIG. 2A is a signal waveform diagram showing an example of a baseband signal Sbb generated by the baseband signal generator 41 in the wireless communication system of FIG. 1, the baseband signal Sbb having an odd number of bits per one frame (in the first case). In addition, FIG. 2B is a signal waveform diagram showing an example of a transmission signal Str outputted from a mixer 11 in the first case in the wireless communication system of FIG. 1. Further, FIG. 2C is a signal waveform diagram showing an example of a received signal Ste outputted from a signal combiner 13 in the first case in the wireless communication system of FIG. 1. It is noted that FIGS. 2A to 2C show the case where the baseband signal Sbb has 5 bits per one frame.

As can be seen from FIG. 2A to FIG. 2C, in the first case, when the number of bits per one frame of the baseband signal is an odd number, the problem of amplifying noise components in the reading part within a frame does not occur.

Figure 3A:
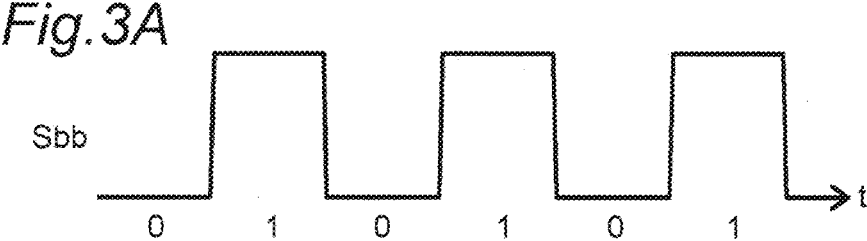
FIG. 3A is a signal waveform diagram showing an example of the baseband signal Sbb generated by the baseband signal generator 41 in the wireless communication system of FIG. 1, the baseband signal Sbb having an even number of bits per one frame (referred to as a second case hereinafter).
Figure 3B:
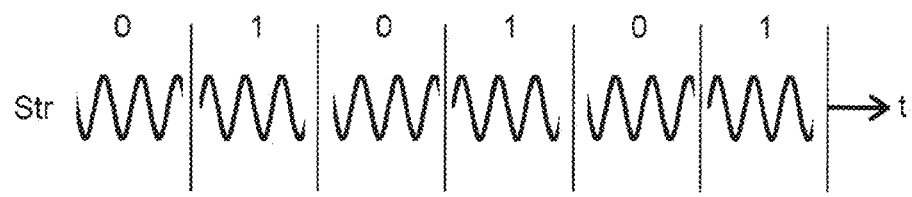
FIG. 3B is a signal waveform diagram showing an example of the transmission signal Str outputted from the mixer 11 in the second case in the wireless communication system of FIG. 1.
Figure 3C:
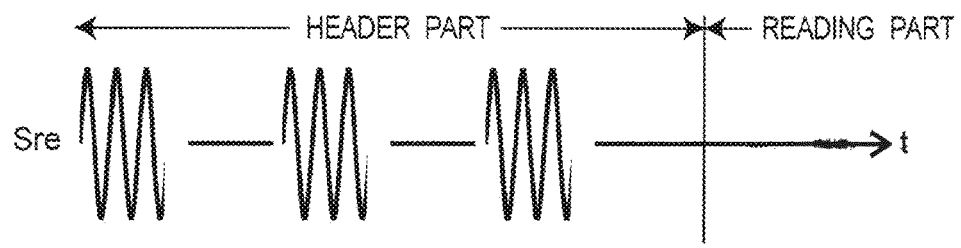
FIG. 3C is a signal waveform diagram showing an example of the received signal Ste outputted from the signal combiner 13 in the second case in the wireless communication system of FIG. 1.

FIG. 3A is a signal waveform diagram showing an example of the baseband signal Sbb generated by the baseband signal generator 41 in the wireless communication system of FIG. 1, the baseband signal Sbb having an even number of bits per one frame (in the second case). In addition, FIG. 3B is a signal waveform diagram showing an example of the transmission signal Str outputted from the mixer 11 in the second case in the wireless communication system of FIG. 1. Further, FIG. 3C is a signal waveform diagram showing an example of the received signal Ste outputted from the signal combiner 13 in the second case in the wireless communication system of FIG. 1. It is noted that, in FIGS. 3A to 3C, the baseband signal Sbb has 6 bits per one frame.

As can be seen from FIGS. 3A to 3C, in the second case, when the number of bits per one frame of the baseband signal is an even number, any noise components can be prevented from being amplified in the reading part within the frame.

According to the embodiment configured as described above, the phase adjuster 21 determines whether the number of bits per one frame of the input baseband signal Sbb is an odd number or an even number. When the number of bits per one frame of the baseband signal Sbb is an even number, the cancellation signal Sca can be inverted to prevent the noise components from being amplified in the reading part of the frame.

In the above embodiment, the case of the PSK modulation is described, but the present invention is not limited to this. In addition to the PSK modulation, the invention can be applied to other digital phase modulation cases.

INDUSTRIAL APPLICABILITY

The present invention can be applied, for example, to wireless communication systems such as RFID (Radio Frequency Identification) systems.

The invention claimed is:
1. A wireless communication system comprising
a plurality of wireless communication devices each using a digital phase modulation and each performing half-duplex communication, the plurality of wireless communication devices being configured as an array, each of the plurality of wireless communication devices comprising:
an analog transmission circuit configured to generate and transmit a transmitted wireless signal by the digital phase modulation of a carrier signal according to a transmitted baseband signal;
a cancellation circuit configured to generate a cancellation signal based on the transmitted baseband signal by controlling at least one of a phase and an amplitude of the carrier signal; and
an analog receiver circuit configured to receive the transmitted wireless signal transmitted from another wireless communication device as a received wireless signal, generate a synthesized composite wireless signal by combining the transmitted wireless signal with the cancellation signal, and digitally-phase-demodulate the transmitted baseband signal by mixing the synthesized composite wireless signal with the carrier signal,
wherein the cancellation
circuit determines whether a number of bits per frame of the transmitted baseband signal is odd or even by counting the number of bits per frame of the transmitted baseband signal,
(A) when the number of bits per frame of the transmitted baseband signal is an odd number, the cancellation circuit shifts and outputs the cancellation signal by a predetermined amount of phase shift, and
(B) when the number of bits per frame of the transmitted baseband signal is an even number, the cancellation circuit shifts and outputs the cancellation signal by a predetermined shift amount plus 180 degrees,
thereby preventing amplification of noise components in the frame of the received baseband signal.
2. The wireless communication system as claimed in claim 1,
wherein the wireless communication system is an RFID wireless communication system.

* * * * *